E. WYLDE & C. SCHENCK.

DOOR CONTROLLING DEVICE.

APPLICATION FILED APR. 21, 1913.

Reissued June 15, 1915.

13,932.

2 SHEETS—SHEET 1.

Witnesses:
C. A. Jarvis
F. D. Cameron

Inventors
Edward Wylde
Charles Schenck
by Newell & Neal
their attorneys.

E. WYLDE & C. SCHENCK.

DOOR CONTROLLING DEVICE.

APPLICATION FILED APR. 21, 1913.

Reissued June 15, 1915.

13,932.

2 SHEETS—SHEET 2.

Witnesses
C. A. Jamy
F. B. Ammen

Inventors
Edward Wylde
Charles Schenck
by Russell & Neal
Their attorneys.

UNITED STATES PATENT OFFICE.

EDWARD WYLDE, OF NEW YORK, N. Y., AND CHARLES SCHENCK, OF CHICAGO, ILLINOIS, ASSIGNORS TO ELEVATOR SUPPLY & REPAIR COMPANY, OF CHICAGO, ILLINOIS, A CORPORATION OF ILLINOIS.

DOOR-CONTROLLING DEVICE.

13,932. Specification of Reissued Letters Patent. Reissued June 15, 1915.

Original No. 1,044,115, dated November 12, 1912, Serial No. 697,921. Application for reissue filed April 21, 1913. Serial No. 762,752.

*To all whom it may concern:*

Be it known that we, EDWARD WYLDE and CHARLES SCHENCK, citizens of the United States, residing at New York city, New York, and Chicago, Illinois, respectively, have invented certain new and useful Improvements in Door-Controlling Devices, of which the following is a clear, full, and exact description.

Our invention relates to a door-controlling device, and our object is to provide a construction which will prevent an unauthorized opening of the door even though the door is not entirely closed.

Our invention will be set forth in the claims.

Figure 1:
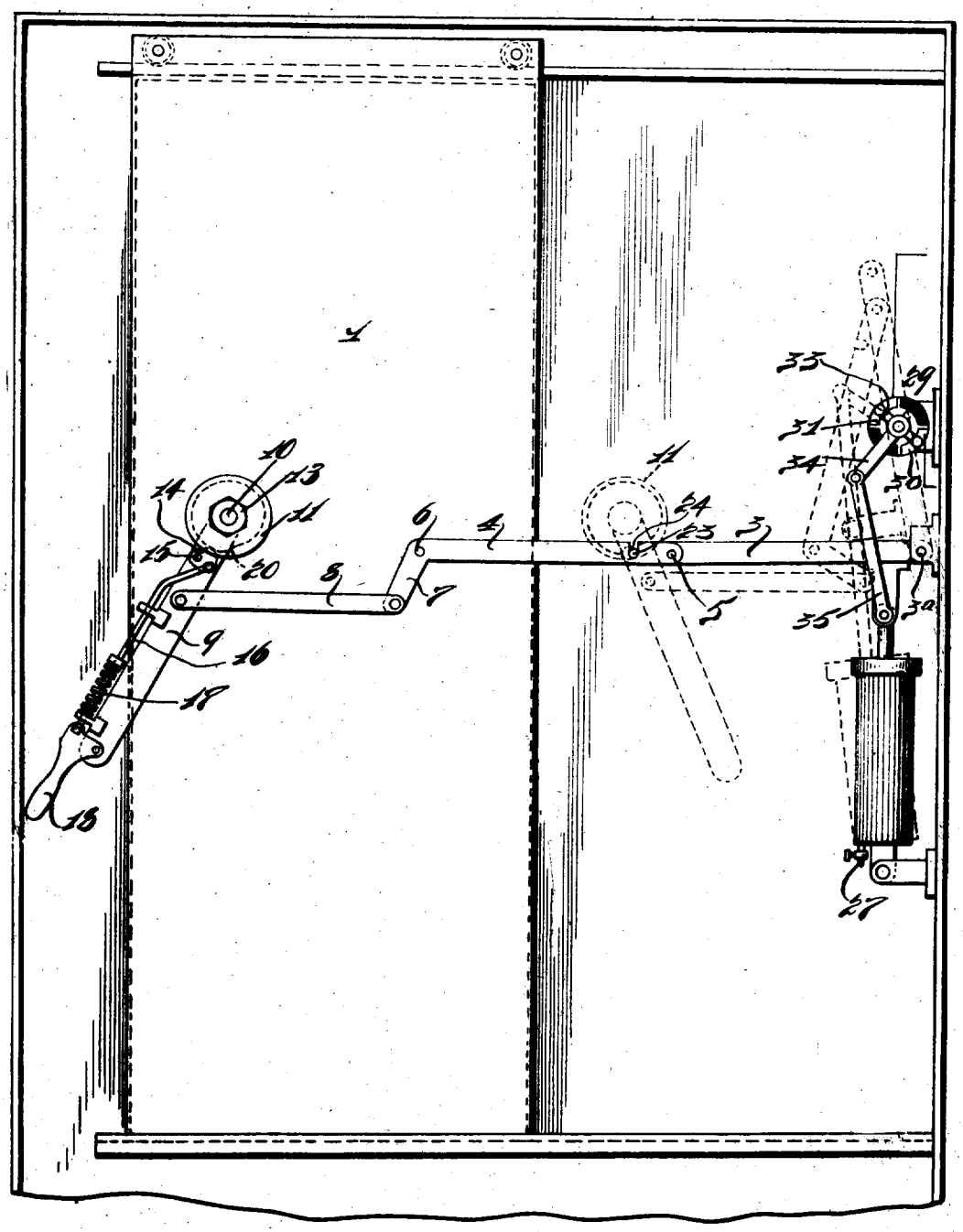
Figure 2:
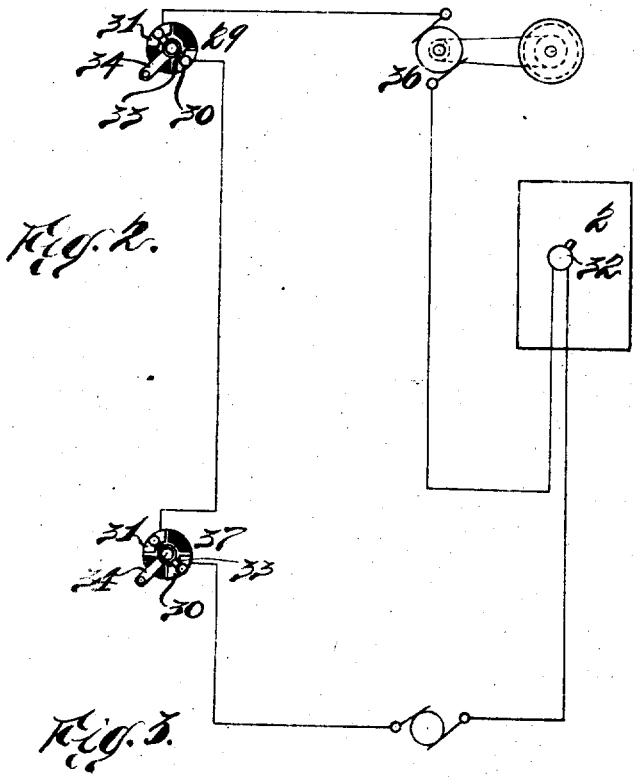
Figure 3:
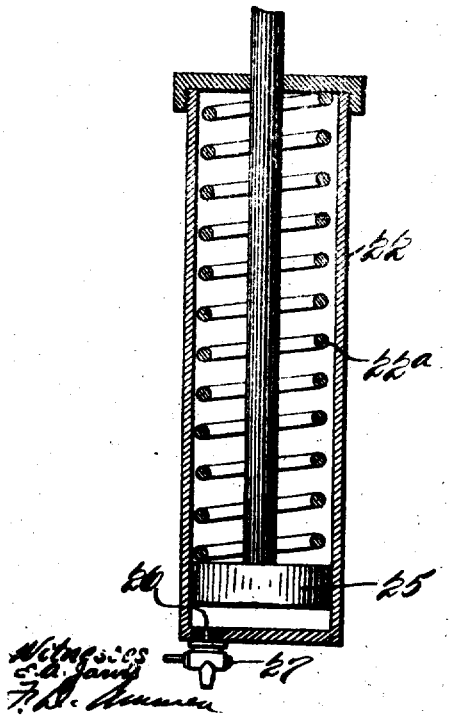
Figure 4:
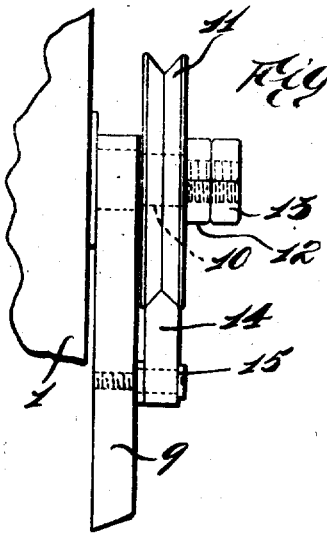

In the preferred embodiment of our invention shown in the drawings, Figure 1 is a side elevation of a portion of the mechanism; Fig. 2 is a diagrammatic view of a preferred form of circuit which may be used when the door-controlling construction is combined with an elevator; Fig. 3 is a detail view of the dash-pot; and Fig. 4 is a detail.

1 is a door or gate which, in the present embodiment, is horizontally slidable and is located, for example, at one of the floors and allows access to the elevator 2 moving up and down in the well or hatchway of a building.

In the embodiment shown in the drawings, we have provided an automatic closing means for the door which, as illustrated, comprises a toggle consisting of levers 3 and 4 pivoted together at 5. Lever 3 is pivoted on a stationary pivot $3^a$, and lever 4 is pivoted to the door at 6. Pivoted to the lateral extension 7 of the lever 4, is a link 8, which is also pivoted to a lever 9, which lever is pivoted on a fixed stud 10 carried by the door. It will be obvious that when the door is open, as illustrated in dotted lines, the movement of the toggle will cause the door to close, and conversely the movement of lever 9 toward the right will break the toggle and open the door. The toggle and levers described may therefore be considered to be either a means for opening the door, or a means for closing.

In order to prevent an unauthorized opening movement of the door when the same has been partially closed, we have provided two parts freely movable past each other during the closing movement, but adapted automatically to engage on a reverse movement. In the preferred embodiment shown in Fig. 1 of the drawings, one of these parts is a grooved wheel 11 normally fixed on the stud 10 by the lock-nuts 12 and 13, which also allow the wheel to be adjusted if desired. The other part of the locking device is, in this embodiment, a cam 14 pivoted at 15 to the lever 9. Connected to this cam is a sliding rod 16 carrying coil spring 17, which normally presses the rod and cam toward the wheel. 18 is one means of moving the cam which, in the present embodiment, is a handle. Further movement of the handle 18 operates through the lever 9 to break the toggle. It will be obvious that when the door is moving to the left in its closing movement, the grooved wheel 11 and the cam 14 will move freely past each other (except of course for the slight friction between the two, which is inconsiderable), but after the cam has traveled past the point 20, any attempted movement of the door in the reverse direction will cause the V-shaped portion of the cam to engage the groove in the wheel and lock the two together, thereby preventing the movement of the door in its opening direction.

It will be observed that there are two parts which are freely movable past each other during the closing movement of the door, but adapted automatically to engage on an attempted reverse movement. Therefore if the elevator operator does not completely close the door, it cannot be opened from the outside of the shaft sufficiently to allow a person to pass through. It will also be observed that the cam 14 acts as a supplementary toggle lock, for when the door is shut it holds the toggle immovable, giving additional safety.

In order to automatically close the door, we have provided a spring-pressed dash-pot 22, the piston of which is connected to the lever 3 of the toggle, so that when the operator releases the handle 18 after having opened the door, the force of the spring $22^a$ will cause the toggle to shut and force the door to its closed position, as illustrated in Fig. 1. The toggle slightly passes the dead center in order to lock the door closed and is stopped from further movement by any suitable construction, such as a pin 23 on link 3, which engages a slot 24 on the link 4. In order to cushion the closing movement, the piston 25 fits closely in the dash-pot casing and forces the air out of a restricted opening 26, thereby giving a well known cushioning effect, which may be varied as desired by a suitable valve 27.

In the operation of high speed elevators in a building, it is important to save all the time possible, and if an operator cannot start his car until the door is entirely closed, much time is lost. It is therefore desirable to prevent the starting of the car until the door is partially closed, but to permit the car to be started before the door is entirely shut. We have provided an electric switch controlled by the door-operating mechanism and which prevents the starting of the elevator until a predetermined point in the closing movement of the door is reached. Such a switch is illustrated, for example, in Fig. 1 at 29, in which the segments 30 and 31 are in the electric circuit with the controller 32 in the car, and with a switch arm 33 bridging the same and operable by suitable links 34, 35 from the power-operating mechanism. In Fig. 2 we have shown the same diagrammatically, in which 36 indicates any suitable device for raising and lowering the elevator, such as a motor. 29 is a switch on one of the floors, and 37 is another similar switch at another floor operated by the door mechanism on that floor. It will be obvious that when either door is open, its switch is open and the car cannot be started, but as the door closes, the switch arm 38 is thrown to close the circuit. This feature is claimed in our United States Letters Patent No. 1,105,053, granted July 28, 1914.

It will be obvious that by the safety-lock arrangement, previously described, the operator may start the car from the floor without waiting for the complete closing of the door, because the door cannot be opened even though it were slightly ajar and with the toggle somewhat broken. The cushioning effect of the dash-pot is to cause the door to move somewhat slowly as it approaches the closed position, and as the operator may safely start his car before waiting for the complete closure, a material amount of time is saved which would otherwise be lost. This is particularly important in the operation of high speed elevators. The value of such a construction will be evident to any person familiar with the practical needs of high speed elevator service.

We are aware that our invention may be embodied in devices widely differing from those preferred embodiments shown in the drawings and without departing from the scope of the claims herein made. We therefore do not desire to be limited to the constructions illustrated and described.

What we claim is:

1. In a door-controlling mechanism, a movable door, a locking device preventing the opening movement of said door when the same has been partially closed and comprising two parts bodily moved by the door when it is moved and also freely movable past each other during the closing movement but adapted to engage immediately on a reverse movement of the closing door from any one of a plurality of positions, and automatic means for closing said door and moving one of said two parts independently of said door.

2. In a door-controlling device, means for opening a door, means for closing a door, said closing means being arranged to permit the free movement of the door in either direction when opened beyond a predetermined point and adapted to prevent a movement of said door in a direction to reopen the same when said door is reaching its closed position.

3. In a door-controlling device, a door, mechanism for opening and closing said door and comprising a toggle one member of which is attached to the door and the other to a relatively stationary part, and a movable member mounted on the door and adapted to break the toggle and open the door, and means comprising two parts freely moved past each other but adapted to engage on a reverse movement of the door from any one of a plurality of points during the latter part of the closing movement of the door for positively checking an opening movement of the door when the door passes a predetermined point in its closing movement, said mechanism being arranged to permit the free movement of said door in each direction when open beyond said predetermined point.

4. In combination a door, mechanism for closing the door comprising a toggle, one member of which is attached to the door and the other to a relatively stationary part, and means comprising two parts freely moved past each other but adapted to engage and stop the door on a reverse movement of the door from any one of a plurality of points during the latter part of the closing movement of the door, a manually-operated member movably mounted on the door and arranged to break the toggle, and then by a pressure on said member in the door-opening direction to open the door and toggle.

5. In combination a door, a check device comprising two parts both mounted on the door and freely moved past each other by the closing movement of the door but adapted to engage and prevent an opening movement from any one of a plurality of points during the latter portion only of its closing travel.

6. In combination a door, a check device comprising two parts both mounted on the door and freely moved past each other by the closing movement of the door but adapted to engage and prevent an opening movement from any one of a plurality of points during the latter portion only of its closing travel, and a movable handle carried by the door and connected to one of said parts so as to unlock said parts at any time when they are engaged.

7. In combination, a sliding door, a toggle connected to a stationary part and also to the door, a toggle-lock comprising two engaging parts freely movable past each other during the closing movement but adapted to engage on a reverse movement of the door from any one of a plurality of points near its closed position, and a part carried by the door and adapted when moved in one direction to separate said engaging parts when in engageable position and then break said toggle to open the door.

8. In combination, a sliding door, a toggle connected to a stationary part and also to the door, a toggle-lock comprising two engaging parts freely movable past each other during the closing movement but adapted to engage on a reverse movement of the door from any one of a plurality of points near its closed position, one of said engaging parts comprising an extended surface and the other a pawl adapted to travel over the same and arrange to lock the door when in its completely-shut position, and a part carried by the door and adapted when moved in one direction to separate said engaging parts when in engageable position and then break said toggle to open the door.

9. In combination, a door, coöperating checking members carried by the door and movable by the movements of the door into and out of coöperative relation, said checking members being arranged to coöperate at any one of a plurality of points in the latter portion of the closing movement of the door to prevent opening movement of said door.

10. In combination, a door, relatively movable coöperating checking members carried by the door and movable by the closing and opening movements of said door into and out of coöperative relation, said members being arranged to coöperate at any point in the latter part of the closing movement of said door to prevent an opening movement of the door.

11. In combination, a door, relatively movable coöperating checking members carried by said door and arranged to be brought by the closing and opening movements of said door into and out of coöperative checking relation to each other, said members being constructed to coöperate during the latter portion only of the closing movement of the door to prevent opening movement of said door from any point in said portion of its closing movement.

EDWARD WYLDE.
CHARLES SCHENCK.

Witnesses to E. Wylde:
R. T. Wolfe,
H. M. Weiss.
Witnesses to C. Schenck:
A. H. Harvey,
F. J. Hamer.